United States Patent
Swanson et al.

[15] 3,699,678
[45] Oct. 24, 1972

[54] MANUAL DISCONNECT AND FEATHERING CONTROL FOR A HYDROSTATIC TRANSMISSION

[72] Inventors: William C. Swanson, Clarendon Hills; Donald W. Moyer; Rodger W. Asmus, both of Downers Grove, all of Ill.

[73] Assignee: International Harvester Company, Chicago, Ill.

[22] Filed: Nov. 5, 1970

[21] Appl. No.: 87,327

Related U.S. Application Data

[63] Continuation of Ser. No. 11,930, Feb. 19, 1970, abandoned, which is a continuation of Ser. No. 731,473, May 23, 1968, abandoned.

[52] U.S. Cl. ............... 60/53 R, 60/53 A, 180/66 R
[51] Int. Cl. ............................................. F16h 39/10
[58] Field of Search...60/53 R, 53 A, 52 S; 180/6.48, 180/44 F, 66 R

[56] References Cited

UNITED STATES PATENTS

| | | |
|---|---|---|
| 2,465,758 | 3/1949 | Sedgwick et al. ......... 60/52 HF |
| 2,789,542 | 4/1957 | Vanderkaay .............. 60/53 X |
| 3,153,900 | 10/1964 | Pigeroulet et al. ......... 60/53 X |
| 3,199,286 | 8/1965 | Anderson ................. 60/53 X |
| 3,213,621 | 10/1965 | Swift et al. ................ 60/53 A |
| 3,284,999 | 11/1965 | Lease ..................... 60/53 A X |
| 3,383,857 | 5/1968 | Rajchel et al. ............. 60/53 A |
| 3,393,509 | 7/1968 | Kempson .................. 60/53 R |
| 3,398,530 | 8/1968 | Prevallet et al. ........... 60/53 A |

*Primary Examiner*—Edgar W. Geoghegan
*Attorney*—Floyd B. Harman

[57] ABSTRACT

A hydraulic control system for a hydrostatic transmission in which a manual disconnect and feathering valve means are provided in conjunction with high pressure relief valve means to disrupt power flow through the transmission to be used under emergency conditions, for clutching and feathering the transmission during other conditions. The means provided make it possible to shunt fluid pressure from its normal path of flow in the hydrostatic loop so that drive is disengaged in whole or in part.

10 Claims, 5 Drawing Figures

PATENTED OCT 24 1972 3,699,678

INVENTORS
WILLIAM C. SWANSON
DONALD W. MOYER
RODGER W. ASMUS

Ronald C. Kamp
ATT'Y

FIG. 2.

INVENTORS
WILLIAM C. SWANSON
DONALD W. MOYER
RODGER W. ASMUS

Ronald C. Kemp
ATT'Y

MANUAL DISCONNECT AND FEATHERING CONTROL FOR A HYDROSTATIC TRANSMISSION

CROSS REFERENCE

This application is a continuation of application Ser. No. 11,930 filed 19 Feb. 1970, which was a continuation of U. S. application Ser. No. 731,473 filed May 23, 1968, both of said applications now abandoned.

This invention relates to hydrostatic transmissions but more particularly to control means for providing a manual disconnect and feathering control for a transmission of this type when incorporated in a vehicle.

It is well known that hydrostatic transmissions are frequently employed in the power train for transmitting drive between the engine and propulsion wheels of a vehicle. However, despite the increasing use of hydrostatic transmissions in vehicles, such arrangements continue to encounter problems. One such problem is the building up of excess pressure in emergency stop situations, for example.

Another problem that has been encountered with such transmissions has been in providing satisfactory feathering operation for the transmissions. This problem arises particularly in providing an inching feature in farm tractor vehicles necessary to the maneuvering of the vehicles when moving them into positions for attaching implements or trailers.

Accordingly, a principal object of the present invention is to provide feathering control means to be used in conjunction with a hydrostatic transmission for disrupting power flow through the transmission when the occasion demands.

Another object is to provide drive disconnect and feathering control means for disrupting power flow through the transmission when the drive pressure is in either loop of a hydrostatic transmission.

Another object is to provide feathering control means in tandem arrangement including separate manually operable pilot valves operably associated with high pressure relief valves associated with each loop of a hydrostatic transmission.

A still further object is to provide feathering control means for a hydrostatic transmission including manually overrideable means wherein the feathering control means is connected by check valve means to each relief valve associated with the respective loops of the transmission.

The above and other objects and advantages of the invention will be more readily apparent when read in conjunction with the accompanying drawings in which.

Figures 1, 4:
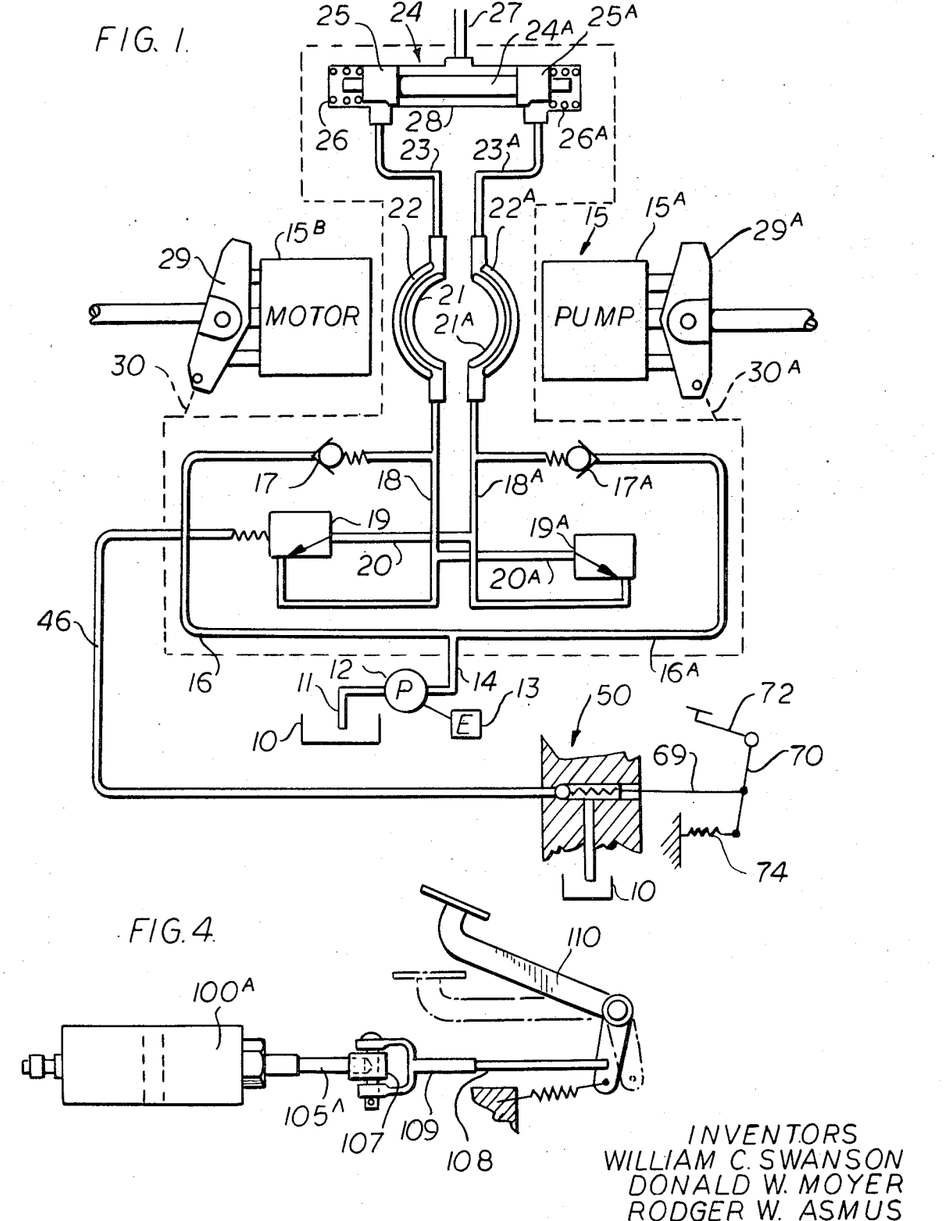
FIG. 1 is a diagrammatic view illustrating mechanical and fluid circuit features of a hydrostatic transmission embodying the present invention.
FIG. 4 is a view in elevation showing the pedal connection to the tandem feathering and relief valve unit of FIG. 3.

Referring now to the drawings, there is shown in FIG. 1 a general representation of a portion of a hydrostatic transmission system of the type customarily incorporated in vehicles for propulsion thereof and a feathering and relief valve unit connected thereto. A fluid reservoir 10 is connected by a conduit or passage 11 with the inlet of a fluid supply pump 12 which may be driven by suitable means such as the engine indicated at 13. An outlet of pump 12 opens into a conduit 14 and the latter in turn connects with an inlet of a motor-pump unit indicated generally by reference numeral 15. This portion of the system supplies the charge or make-up fluid to the motor-pump unit from pump 12 and together with the outlet circuit of said unit is commonly referred to as the charge circuit. It will be understood, of course, that the pump component 15a thereof will be operatively connected to suitable driving means such as the engine or motive power of an associated vehicle (not shown) while the motor component 15b will be suitably connected to other equipment, such as the drive train of a vehicle (not shown), to drive said vehicle. Since the motor-pump unit 15 is generally conventional, such, for example, as the hydraulically interconnected and back-to-back arranged motor-pump unit described in the Hann et al. U.S. Pat. No. 3,126,707, no extensive elaboration of the details or construction thereof need be included herein. Conduit 14 connects into said motor-pump unit by way of a pair of conduits 16, 16a (FIG. 1) which connect into respective check valves 17, 17a of conventional construction while the outlet sides of the latter valves open into the respective conduits 18, 18a which, in turn, connect at one end thereof into the respective pilot-operated high pressure relief valves 19, 19a. The outlets of the high pressure relief valves 19, 19a are cross-connected by conduits 20a, 20 with the respective inlets of valves 19a, 19 so as to by-pass a large flow of fluid therebetween upon opening of either one of these relief valves as a result of an excessively high pressure in the associated circuit. The opposite ends of conduits 18, 18a communicate with the kidney-shaped ports 21, 22a and 21a, 22a of the respective pump and motor components of said unit, and additional conduits 23, 23a communicating with the respective kidney ports connect into opposite ends of a shuttle valve 24. Said shuttle valve, which is of conventional construction, may include a piston 24a having enlarged heads 25, 25a at opposite ends thereof, and centering springs 26, 26a whereby said piston is maintained centered when the transmission is operating in its neutral position. An outlet or discharge conduit 27 communicates with a chamber 28 formed between the opposite heads 25, 25a of said valve and which chamber upon operation of said valve is adapted to communicate with a respective one of conduits 23, 23a. When either of the conduits 23, 23a is subjected to high pressure, the piston 24a will be shifted connecting the discharge conduit 27 with the other of the conduits 23, 23a which will be at low pressure. The fluid exhausted through the conduit 27 is then utilized for cooling the pump and motor mechanisms as shown in the aforementioned Hann et al patent.

It will be appreciated, of course, that valves 17, 17a, and 19, 19a together with the pump and motor kidney ports 21, 21a and 22, 22a and shuttle valve 24 may be fashioned as part of the motor-pump unit 15 whereupon many of the conduits designated as interconnecting these components may be constituted as fluid passages formed in the casing, housing or valve plate members rather than as separate or individual elements.

The swash plates 29, 29a of the respective motor and pump components of the unit 15 may be operatively connected for displacement by suitable means such as indicated schematically at 30, 30a, with suitable servos and servo actuating means (not shown) for controlling the displaced positions of said plates according to well known principles of operation of such mechanisms. For purposes of simplification of the instant application such servo displacement control means as well as other components of the transmission system not particularly pertinent to the present invention are omitted, but since they are substantially identical to the disclosure in copending U.S. patent applications, Ser. No. 548,184 filed May 6, 1966 now Pat. No. 3,360,934 and Ser. No. 589,895 filed Oct. 27, 1966, now Pat. No. 3,387,454 and assigned to the same assignee as the present invention, reference may be had thereto for a further and more comprehensive elaboration thereof.

Figure 2:
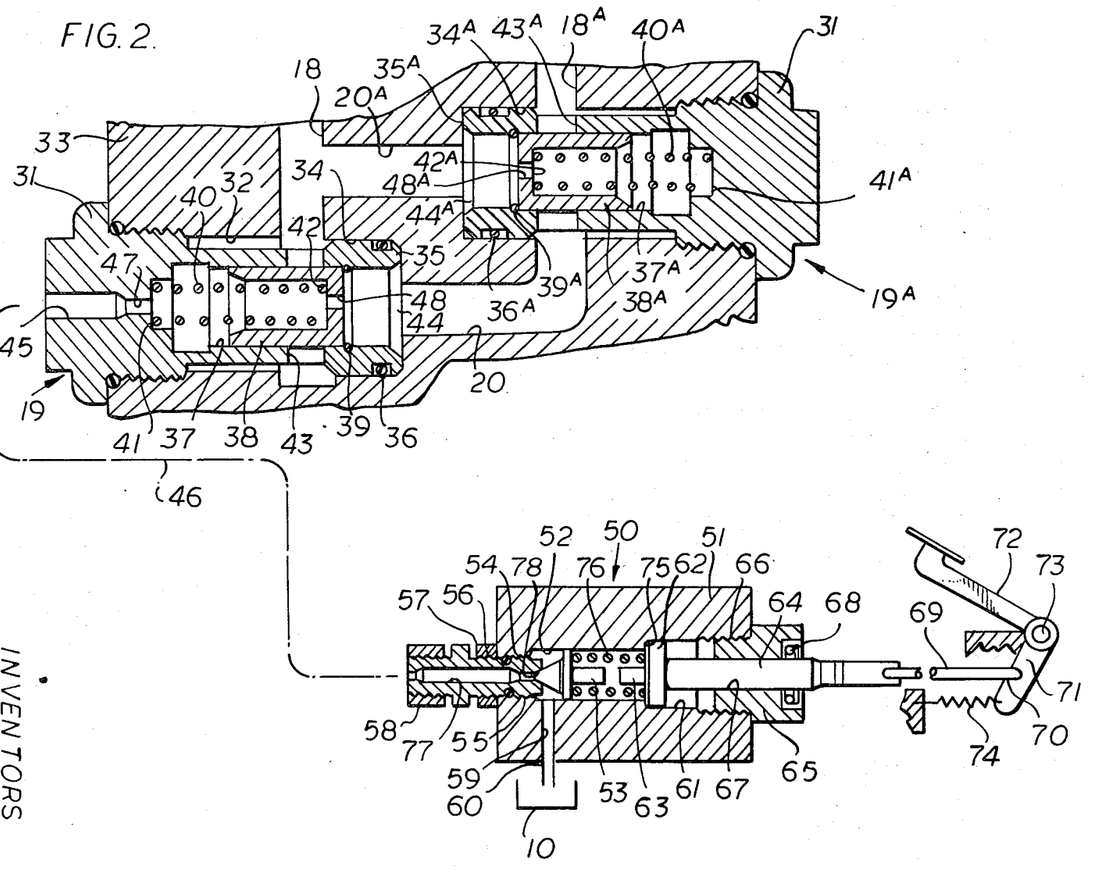
FIG. 2 is a view of a portion of FIG. 1 showing in enlarged section the high pressure relief valve means and a feathering and relief valve associated therewith.

Since the high pressure relief valves 19, 19a are identical and of conventional construction, except for the remote pilot control thereof, only one thereof need be described in detail with comparable elements of the second such valve being designated by the same reference character plus the suffix a. These valves are of the same type as disclosed in copending International Harvester Company application for U.S. Pat. Ser. No. 585,902, filed Oct. 11, 1966, now Pat. No. 3,398,531. As shown in FIG. 2, each such valve may include an outer sleeve-like body 31 threadably mounted in a bore 32 formed in a casing member such as 33 which may be constituted as a portion of the valve porting plate or center section of the motor-pump unit 15. Bore 32 has a portion 34 at the inner end thereof that accepts a head portion 35. The head portion 35 may be fitted with a fluid seal 36 to restrict flow of fluid therealong. A bore 37 in body 31 slidably receives a sleeve valve 38 which normally abuts a snap ring 39 mounted in an annular recess in bore 37. A spring 40 compressibly disposed between an end wall 41 of body 31 and an end wall 42 of sleeve valve 38 continuously urges said sleeve valve 38 into abutting contact with snap ring 39. A plurality of radial openings 43 in body 31 communicate with a respective one of the conduits or passages 18, 18a while the open end 44 of said body 31 communicates with the respective one of the conduits or passages 20, 20a. An axially extending opening 45 in the closed end of body 31 communicates with a pilot control conduit 46. A reduced section portion 47 of opening 45 provides a restricting orifice, and a similar restricting orifice opening 48 coaxially aligned therewith is provided in the closed end wall 42 of sleeve valve 38.

The control conduit 46 communicates with a feathering and a relief valve unit 50 which is adapted to discharge into reservoir 10. The unit 50 is a high pressure pilot and relief valve having a mechanical overrideable control. A valve of this type is described in copending International Harvester Company application for U.S. Pat. Ser. No. 585,902, filed Oct. 11, 1966.

The valve unit 50 includes an outer casing or body member 51 having a central bore 52 therethrough which slidably receives a pilot poppet element 53, and an adjustable seat element 54 which may be secured by suitable thread means 55 in the bore 52. Additional thread means 56 cooperate with a lock nut 57 whereby said adjustable seat element may be securely fixed in any one of a plurality of positions in the casing 51 in order to compensate for manufacturing deviations. A threaded coupling 58 may be provided to couple the conduit 46 to the valve unit 50. An outlet opening 59 communicates with the interior of bore 52 and is connected by suitable conventional means with a conduit 60 which discharges into reservoir 10.

One end of bore 52 is fashioned with an enlarged bore portion 61 that slidably accommodates a plunger-like spring stop member 62 having a spring guide pin or stud 63 extending from one face thereof and a rod or stem 64 extending from an opposite face of said stop. A stop guide 65 threadably mounted as by the threads 66 in the enlarged bore portion 61 has an axial opening 67 that slidably accommodates the rod or stem 64 therein. A fluid seal 68 may be provided for well known purposes in the end of stop guide 65. Pivotally coupled to stem 64 is a push-pull rod 69 the opposite end of which is pivotally connected at 70 to an arm 71 of a foot pedal member 72 pivotally mounted at 73 by suitable means to a fixed support such as a portion of an associated vehicle (not shown). A return spring 74 interconnects the arm 71 also to the fixed support and as disposed constantly urges the pedal 72 to an up position and the stop 62 into engagement with the end wall 75 of enlarged bore portion 61. A spring 76 disposed between the poppet 53 and stop 62 normally urges said poppet into a position against the seat element 54 to restrict fluid flow therethrough. It will be noted a small axially extending space is provided between the ends of the poppet element 53 and the spring guide stem 63, so as to permit limited movement of the poppet without displacing the spring stop 62.

An axial opening 77 in seat element 54 has a reduced section portion 78 therein that provides a restricting orifice.

It will be seen that as pedal 72 is depressed, spring stop 62 is displaced thereby relieving the compressive reaction of spring 76 and permitting the fluid pressure in portion 78 to force poppet 53 off its seat and dump fluid into the reservoir 10 by way of conduit 60.

OPERATION

The supply pump 12 provides a charge fluid at a low pressure by way of conduit 14 to the motor-pump unit 15, and with said unit operating, the motor thereof being driven by fluid under pressure from the unit's drive pump, fluid is circulated around the transmission loop inter-connecting said motor and drive pump of the unit. Under this condition the fluid in the high pressure side of this loop becomes effective for actuating shuttle valve 24, moving the piston 24a away from its normally centered position with the transmission in neutral, and moving it to the right or left depending on the tilted or displaced position of the swash-plates in the motor-pump unit, while concomitant therewith the low pressure or return side of said transmission loop operating at a lower pressure becomes effective to permit opening of the corresponding one of the check valves 17 or 17a to admit make-up or charge fluid from the respective one of the supply lines 16, 16a. With shuttle valve piston 24a open, conduit 27 serves to transfer fluid discharged thereinto from the motor-pump unit to other parts of the system for cooling and return to the fluid source. All of the above is, of course, the well known manner of operation for systems of this character. It will be understood that the tilt or displacement of the swash plates to provide forward, neutral or reverse positions of the transmission may be effected responsive to actuation of a speed and direction of movement control means (not shown).

The pilot fluid pressure in conduit 46 acts on the pilot poppet 53 of the high pressure pilot and relief valve 50, but this pressure is not sufficient to open the poppet 53. Under certain operational conditions the pressure in the drive loop of the transmission may become excessive, thus increasing the pressure in pilot control conduit 46 which is effective to automatically open pilot poppet 53 and dump excess pressure to reservoir 10 by way of conduit 60. Under certain other conditions it may be desirable to manually operate the relief valve 50 by selectively depressing and releasing the pedal 72. In an emergency stop situation, for example, if loop 21a – 22a is the drive loop and excess pressure builds up therein, quickly depressing pedal 72 will be effective to move rod 64 of valve 50 to the right. This eases the compressive force on spring 76 and allows poppet 53 to be unseated to effect a dumping of the fluid in conduit 46 through conduit 60 to the reservoir 10. When flow is established through conduit 46 by unseating the poppet 53, there is a pressure drop across the orifice 48 in sleeve valve 38, creating a pressure differential between the upstream side and the downstream side of the sleeve valve 38 permitting pressure in conduit 18a to force valve spool member to the left as seen in FIG. 2, to open relief valve 19. This permits a by-passing or dumping of a large volume of the fluid flow between opposite sides of the hydrostatic loop, that is, to go directly from loop 21a – 22a into loop 21 – 22 thus preventing a build-up of excess pressure in loop 21a – 22a.

During normal operation when the loop 21a – 22a is the drive or high pressure side, the valve unit 50 provides for a smooth feathering action. It acts somewhat as a clutch in that it permits the gradual opening and closing of the pressure side of the hydrostatic loop by selectively depressing and releasing pedal 72. This dumping type action allows disruption of the power flow from the hydraulic drive pump to the hydraulic drive motor in the hydrostatic loop which thereby removes driving torque from the wheels of the vehicle.

If the loop 21 – 22 is subjected to high pressure, such as when the vehicle is operating in reverse or when it is motoring in a forward direction, i.e. when the vehicle drive train is forcing the motor to act as a pump and the pump to function as a motor, charge pressure will be acting on the sleeve valve 38. When the pedal 72 is depressed opening valve 53, flow will again be established through the orifice 48 causing a pressure drop. The charge pressure will then be sufficient to shift the sleeve valve 38 to the left as viewed in FIG. 2. With the sleeve valve in this position, the high pressure loop 21 – 22 will be connected to the low pressure loop 21a – 22a, permitting the dumping of fluid from the high pressure side to the low pressure side of the transmission and interrupting the flow of power. Feathering action is poor in this latter situation because the sleeve valve 38 is not subjected to drive pressure, but only the lower charge pressure and tends to close abruptly when the poppet valve 53 is closed.

When the pedal 72 is depressed the valve 50 may provide a neutral position for the transmission, because in that condition there can be no pressure build-up in either side of the hydrostatic loop to effect power transmission through the motor-pump unit.

Figure 3:
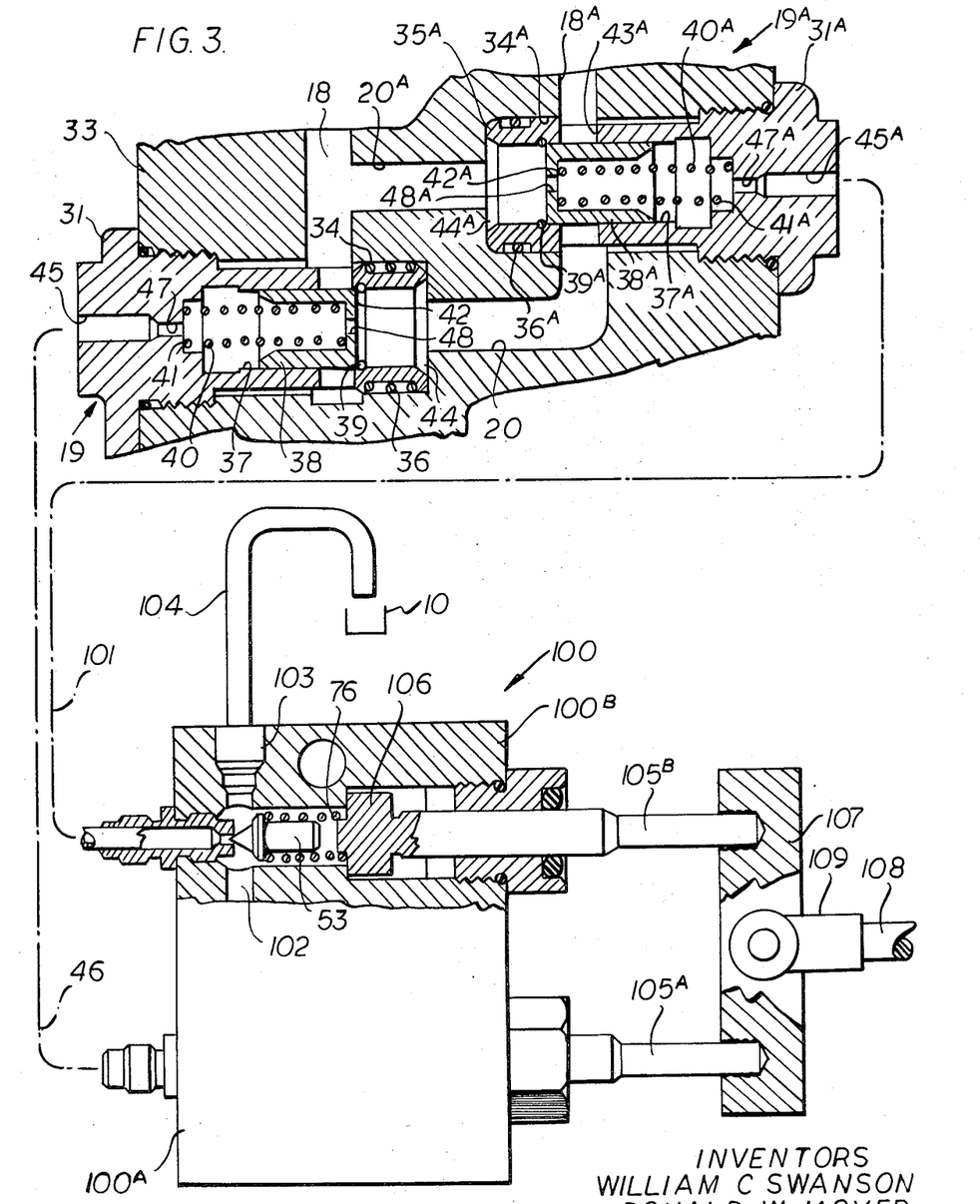
FIG. 3 illustrates an embodiment of a tandem feathering and relief valve means associated with the hydrostatic transmission of FIG. 1.

A second arrangement of a manual disconnect and feathering control valve is shown in FIG. 3. FIG. 3 shows a valve 100 which actually is a tandem arrangement of two valves 100–a and 100–b both of a construction substantially similar to the valve 50 shown in FIG. 2. Control conduit 46 connected to high pressure relief valve 19 communicates with valve 100–a in the same manner as it communicates with valve 50 as shown in FIG. 2. Pilot control conduit 101 is connected to high pressure relief valve 19a just as conduit 46 is connected to relief valve 19 and establishes flow communication with valve 100–b. The valves 100–a and 100–b are interconnected by a conduit 102 so that when the poppet valves 53 of either valve 100–a or 100–b are opened, pilot pressure fluid will be discharged to reservoir 10 by way of passageway 103 and conduit 104. Valve rods or stems 105a and 105b are connected at one end respectively to plunger-like stop members 106 and at their other ends are threadedly secured to an actuating block 107. The latter is connected to a push-pull rod 108 by means of a bi-furcated portion 109, as shown in FIG. 4, and the push-pull rod is connected to a pedal 110 pivotally mounted and arranged to operate in the same manner as pedal 72 shown in FIG. 2.

Both of the valves 100a and 100b are automatically actuatable by virtue of excess pressure in either portion of the hydrostatic loop. Thus drive disconnect is possible with drive pressure in either portion of the hydrostatic loop.

Irrespective of which loop 21–22 or 21a–22a is the driving loop depressing pedal 110 will be effective to disrupt the power flow through the transmission. If the drive pressure is in loop 21a–22a and it becomes desirable to disrupt the power flow in the transmission depressing the pedal 110 will reduce the compressive force of spring 76 in valve 100a and permit the poppet valve 53 of valve 100a to be opened by the pilot pressure in conduit 46. As previously explained in connection with the embodiment of FIG. 2 a pressure drop is then caused at valve 38 permitting the pressure in passage 18a to open valve 38 and allow flow to by-pass directly to loop 21–22. When the drive pressure is in loop 21a–22a only charge pressure will be acting on valve member 38a of high pressure relief valve 19a and the pilot pressure in conduit 101 will not be sufficient to overcome the compressive force of spring 76 of valve 100b even when the pedal 110 is depressed.

In the opposite situation if the loop 21–22 is the driving loop depressing pedal 110 will permit the poppet valve 53 of valve 100b to be opened against the force of spring 76 by the pressure in control conduit 101 thus allowing the dumping of pilot pressure fluid to reservoir 10 via passageway 103 and conduit 104. This causes a pressure drop at sleeve valve 38a permitting the latter to open to by-pass pressure fluid directly to loop 21a–22a. Thus smooth feathering action is permitted when the drive pressure is in either portion of the hydrostatic loop. In addition, transmission disconnect is possible with drive pressure in either loop.

Figure 5:
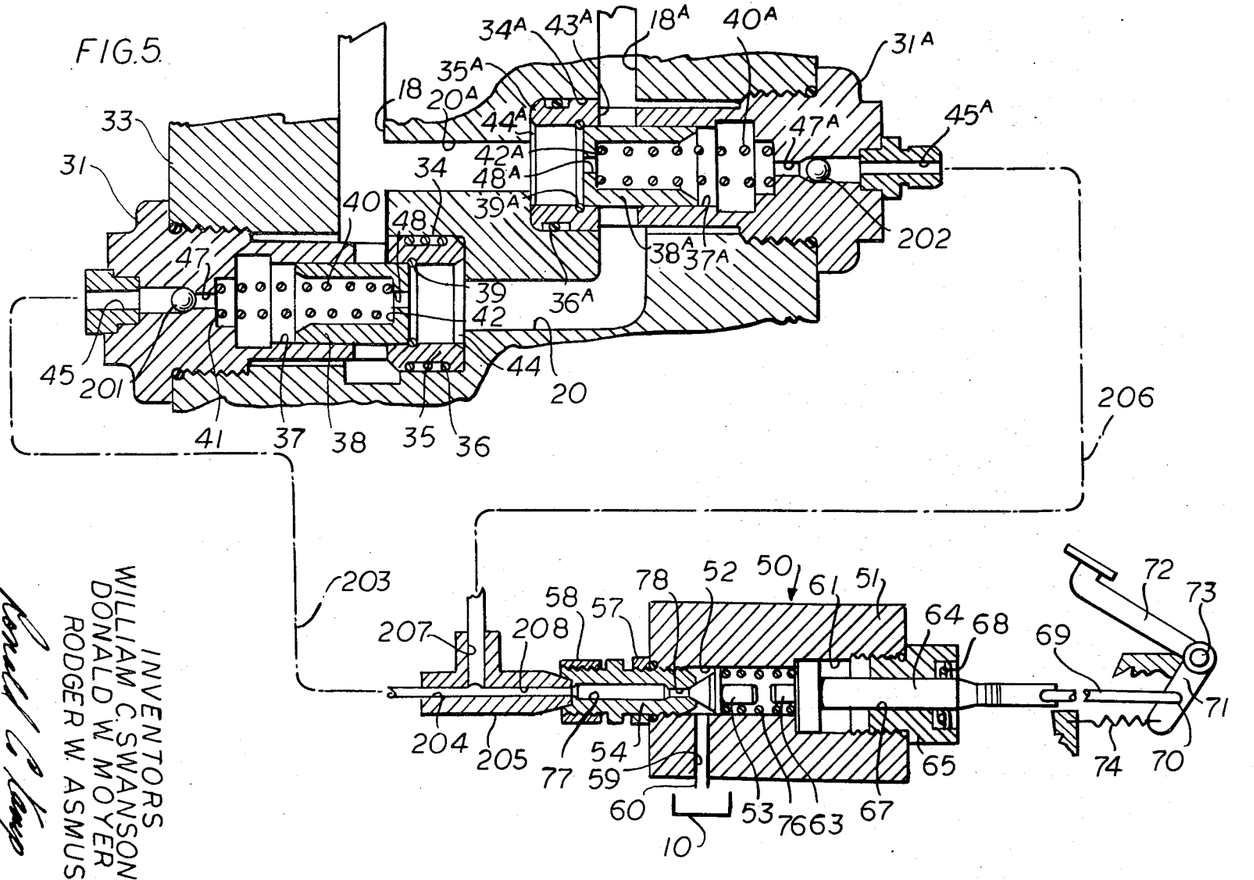
FIG. 5 illustrates an embodiment of a feathering and relief valve means connected with the high pressure relief valves by check valve means.

A third arrangement is illustrated in FIG. 5 wherein the single manual operated feathering valve 50 is connected to both high pressure relief valves 19 and 19a through check valves 201 and 202 associated respectively with valves 19 and 19a. Pilot control conduit 203 connects the opening 45 from relief valve 19 with valve 50 through one branch 204 of a T-connector 205, and pilot control conduit 206 connects the opening 45a from relief valve 19a with valve 50 through another branch 207 of the T-connector 205. Both branches 204 and 207 are in fluid communication with a third branch 208 of the T-connector which is in fluid communication with opening 77 in seat element 54 of valve 50. The check valves 201 and 202 preferably are of the ball type and are positioned in openings 45 and 45a of valves 19 and 19a respectively. They are held in position by the pilot fluid pressure in the respective associated conduits 203 and 206.

With drive fluid pressure in loop 21a–22a that fluid pressure will be carried past high pressure relief valve 19a through passage 20 into high pressure relief valve 19. A pilot flow is permitted through valve 19 by way of orifice openings 48 and 47 and ball check valve 201 into conduit 203. This pilot pressure ordinarily will not be sufficient to unseat poppet valve 53 of the valve 50 and thus pilot pressure is maintained in the system. This pilot pressure also makes its way through conduit 206 by way of the T-connector 205 to act on the ball check valve 202 to hold it in a closed position.

If on the other hand the drive fluid pressure is in loop 21–22, that fluid pressure will be carried through passage 20a into high pressure relief valve 19a. A pilot flow will be permitted through valve 19a by way of orifice openings 48a and 47a and ball check valve 202 into conduit 206. This pilot pressure passes through the T-connector 205 to act on poppet valve 53 but here again is ordinarily not sufficient to unseat the poppet valve. The pilot fluid pressure also passes through T-connector 205 and into conduit 203 to act on ball check valve 201 to hold it in a closed position.

If it becomes desirable to disrupt power flow through the transmission, whether the drive pressure is in loop 21a–22 or 21–22, depressing pedal 72 will release the compressive force on spring 76 permitting poppet valve 53 to open dumping the pilot pressure to reservoir 10 via conduit 60. This causes the pressure in the control conduits 203 and 206 to drop. If the drive pressure is in loop 21a–22a depressing the pedal 72 will cause a pressure drop at valve 38 allowing the latter to open and shunt fluid pressure from loop 21a–22a directly to the other loop 21–22. On the other hand, if the drive pressure is in loop 21–22 opening valve 50 by depressing pedal 72 will permit pressure to be shunted through conduit 18, passage 20a and open valve 38a directly to loop 21a–22a.

The embodiment of FIG. 5 permits smooth feathering action for load push-up and rapid disconnect with pressure in either of the hydrostatic loops. It achieves the same benefits of operation achieved by the embodiment in FIG. 2, but with less expensive components and a simpler linkage.

It will be apparent from the foregoing that we have advantageously provided manual disconnect and feathering control means for a hydrostatic transmission and a variety of means for connecting such means into a transmission system. By acting generally to disrupt the power flow through a hydrostatic transmission, the control means can act as a safety device in emergency stop situations as well as a clutch during normal operation. The feathering feature also permits a smooth pickup of load.

While certain preferred embodiments have been shown for the purpose of illustrating the invention, it is to be understood that the invention is not limited thereto as other variations will be apparent to those skilled in the art and the invention is to be given its fullest possible interpretation within the terms of the following claims.

We claim:

1. In a hydrostatic transmission system having a pump and motor hydraulically interconnected to form a closed circuit unit for transmitting power therethrough, and a reservoir source of fluid at charge pressure, the combination comprising:

a first high pressure pilot-operated relief valve communicatively connected across said closed circuit and normally closed to fluid flow between opposite sides of said closed circuit;

pilot passage means through said relief valve;

high pressure pilot valve means having an inlet and outlet, said outlet being adapted to discharge to the reservoir;

pilot control conduit means directly and exclusively connecting said pilot passage means with said inlet to said high pressure pilot valve means; and manually operable means directly connected to said high pressure pilot valve means for incrementally controlling the opening and closing of the latter, said relief valve movable to permit controllable short circuiting fluid pressure in the closed circuit to control power flow through the transmission in response to establishing fluid flow to the reservoir through the pilot passage means.

2. In a hydrostatic transmission system having a pump and motor hydraulically interconnected to form a closed circuit unit for transmitting power therethrough and a reservoir source of fluid at charge pressure, the combination comprising:

a pair of high pressure pilot-operated relief valves communicatively connected across said closed circuit and normally closed to fluid flow between opposite sides of said closed circuit;

each of said relief valves having pilot passage means;

high pressure pilot valve means having an inlet and outlet, said outlet being adapted to discharge to the reservoir;

pilot control conduit means directly and exclusively connecting said pilot passage means of at least one of said relief valves to said inlet of the high pressure pilot valve means; and manually operable means directly connected to said high pressure pilot valve means for incrementally controlling the opening and closing of the latter;

at least one of said relief valves being movable to permit short circuiting fluid pressure in the closed circuit to infinitely vary power flow through the transmission in response to establishing fluid flow to the reservoir through the pilot passage means.

3. In a hydrostatic transmission system according to claim 2, wherein:
said high pressure pilot valve means includes first and second valves; and
said pilot control conduit means includes first and second conduits,
said first and second conduits being connected to provide fluid communication between each of said pilot passage means and the first and second valves respectively.

4. In a hydrostatic transmission system according to claim 3 wherein:
actuating block means interconnects said first and second valves, and
said manually operable means is connected to said block means to control the opening and closing of both of said first and second valves.

5. In a hydrostatic transmission system having a variable displacement pump and a motor hydraulically interconnected to form a closed circuit unit for transmitting power therethrough, and a reservoir source of fluid at charge pressure, the combination comprising:
a pair of high pressure pilot-operated relief valves communicatively connected across said closed circuit and normally closed to fluid flow between opposite sides of said closed circuit;
each of said relief valves having pilot passage means;
high pressure pilot valve means having an inlet and outlet, said outlet being adapted to discharge to the reservoir;
pilot control conduit means directly connecting both of said pilot passage means to said inlet;
check valve means associated with each of said relief valves for permitting hydraulic fluid flow from said relief valves into said conduit means only; and
manually operable means associated with said high pressure pilot valve means for selectively controlling the opening and closing of the latter;
said relief valves being movable to permit short circuiting fluid pressure in the closed circuit to incrementally vary power flow through the transmission in response to establishing fluid flow to the reservoir through the pilot passage means.

6. In a hydrostatic transmission system having a pump and motor hydraulically interconnected to form a closed circuit unit for transmitting power therethrough, at least one of said pump and motor having a variable displacement, and a reservoir source of fluid at charge pressure, the combination comprising:
a first high pressure pilot-operated relief valve communicatively connected across said closed circuit and normally closed to fluid flow between opposite sides of said closed circuit;
pilot passage means associated with said relief valve;
high pressure pilot valve means having an inlet and outlet, said outlet being adapted to discharge to the reservoir;
pilot control conduit means directly and exclusively connecting said pilot passage means with said inlet to said high pressure pilot valve means; and
manually operable means directly connected to said high pressure pilot valve means for selectively controlling the opening and closing of the latter,
said relief valve movable to permit incremental short circuiting fluid pressure in the closed circuit to vary power flow through the transmission in response to establishing fluid flow to the reservoir through the pilot passage means.

7. In a hydrostatic transmission system having a pump and motor hydraulically interconnected to form a closed circuit unit for transmitting power therethrough, at least one of said pump and motor having a variable displacement, and a reservoir source of fluid at charge pressure, the combination comprising:
a pair of high pressure pilot-operated relief valves communicatively connected across said closed circuit and normally closed to fluid flow between opposite sides of said closed circuit;
each of said relief valves having pilot passage means;
high pressure pilot valve means having an inlet and outlet, said outlet being adapted to discharge to the reservoir;
pilot control conduit means directly and exclusively connecting said pilot passage means of at least one of said relief valves to said inlet of the high pressure pilot valve means; and
manually operable means directly connected to said high pressure pilot valve means for incrementally controlling the opening of the latter;
at least one of said relief valves being movable to permit short circuiting fluid pressure in the closed circuit to vary control power flow through the transmission in response to establishing fluid flow to the reservoir through the pilot passage means.

8. In a hydrostatic transmission system according to claim 7, wherein:
said high pressure pilot valve means includes first and second valves; and
said pilot control conduit means includes first and second conduits,
said first and second conduits being connected to provide fluid communication between each of said pilot passage means and the first and second valves respectively.

9. In a hydrostatic transmission system according to claim 8 wherein:
actuating block means interconnects said first and second valves, and
said manually operable means is connected to said block means to control the opening and closing of both of said first and second valves.

10. In a hydrostatic transmission system having a pump and motor hydraulically interconnected to form a closed circuit unit for transmitting power therethrough, at least one of said pump and motor having a variable displacement, and a reservoir source of fluid at charge pressure, the combination comprising:
a pair of high pressure pilot-operated relief valves communicatively connected across said closed circuit and normally closed to fluid flow between opposite sides of said closed circuit;
each of said relief valves having pilot passage means;
high pressure pilot valve means having an inlet and outlet, said outlet being adapted to discharge to the reservoir;

pilot control conduit means directly connecting both of said pilot passage means to said inlet;

check valve means associated with each of said relief valves for permitting hydraulic fluid flow from said relief valves into said conduit means only; and manually operable means associated with said high pressure pilot valve means for selectively controlling the opening and closing of the latter;

said relief valves being movable to permit variable power flow from the pump to the motor in response to establishing fluid flow to the reservoir through the pilot passage means.

* * * * *